United States Patent [19]
Sherwood

[11] Patent Number: 5,774,796
[45] Date of Patent: Jun. 30, 1998

[54] AIRPLANE PILOT COMMUNICATION AID

[76] Inventor: Robert D. Sherwood, N87 W15714 Kenwood Blvd., Menomonee Falls, Wis. 53051

[21] Appl. No.: 761,813

[22] Filed: Dec. 6, 1996

Related U.S. Application Data

[63] Continuation of Ser. No. 524,542, Sep. 7, 1995, abandoned.
[51] Int. Cl.$^6$ .................................................. H04B 17/00
[52] U.S. Cl. ...................... 455/115; 455/126; 455/67.1
[58] Field of Search .................... 455/67.1, 67.4, 455/67.7, 70, 115, 126, 69, 73–74, 82–83, 89, 9, 86, 216, 575

[56] References Cited

U.S. PATENT DOCUMENTS

| | | |
|---|---|---|
| 1,596,984 | 8/1926 | Marks . |
| 3,970,940 | 7/1976 | Venn ........................................ 455/103 |
| 4,048,564 | 9/1977 | Gleeson ................................ 455/67.7 |
| 4,267,600 | 5/1981 | Campbell ................................. 455/115 |
| 4,361,904 | 11/1982 | Matsumura ................................ 455/67 |
| 4,524,461 | 6/1985 | Kostanty et al. .......................... 455/79 |
| 4,670,789 | 6/1987 | Plume ..................................... 455/115 |
| 5,396,651 | 3/1995 | Nitardy ................................. 455/54.2 |

FOREIGN PATENT DOCUMENTS

| | | | |
|---|---|---|---|
| 60-223240 | 11/1985 | Japan ..................................... 455/115 |
| 2-25128 | 1/1990 | Japan ................................... 455/67.4 |
| 3-234127 | 10/1991 | Japan ..................................... 455/115 |
| 4-94224 | 3/1992 | Japan ................................... 455/67.4 |
| 5-252080 | 9/1993 | Japan ................................... 455/67.4 |

*Primary Examiner*—Nguyen Vo
*Attorney, Agent, or Firm*—Whyte Hirschboeck Dudek

[57] ABSTRACT

A communications system that is used on board an aircraft is described wherein the modulated radio frequency output of the aircraft transceiver is sampled, demodulated and presented to the pilot's headphones while simultaneously being radiated by an antenna. Thus, a pilot is able to hear his transmitted audio signal, i.e. his actual on-the air signal rather than his untransmitted audio signal.

3 Claims, 3 Drawing Sheets

AIRPLANE PILOT COMMUNICATION AID

This is a continuation of application Ser. No. 08/524,542 filed on Sep. 7, 1995, now abandoned.

FIELD OF THE INVENTION

The present invention relates generally to radio communication systems, and in particular to those communication systems that are used on board aircrafts.

DESCRIPTION OF THE PRIOR ART

Communications is the process of transmitting information from one location to another. A communications system generally is comprised of three basic elements: a transmitter, a communications medium, and a receiver. The transmitter takes the information to be communicated, prepares it to be transmitted through the communications medium, and places the signal in the communications medium. The receiver plus its antenna receives the energy from the communications medium and restores the information to the same form as the original.

In the aviation industry, communications systems are modified to address the unique problems associated with communication on board aircrafts. For example, a headset typically accompanies the aircraft transmitter/transceiver because of the ambient noise associated with the aircraft environment. This headset consists of a boom-mounted microphone and headphones, with the headphones fitting snugly over the ears of the pilot to block out the outside noise. Because of the headphones, the pilot is unable to monitor his speech unless the output from the microphone is amplified and fed back to the headphones. In present audio radio communication systems, the amplified output from the microphone is fed directly and immediately to the headphones prior to transmission by the transceiver. Accordingly, the pilot monitors only his untransmitted audio signal and is completely unaware of whether there is any difference between his untransmitted audio signal and his transmitted audio signal, i.e. his actual on-the-air signal.

SUMMARY OF THE INVENTION

It is the object of the present invention to enable a pilot to hear his transmitted audio signal, i.e. his actual on-the air signal. The advantage of hearing his on-the-air signal is that the pilot is made aware of any transmission problems, i.e. if there is no output from the transceiver, if the output is distorted, an unintentional transmission is occurring, etc.

In accordance with the present invention, a communications system that is used on board an aircraft is therefore described wherein the amplitude modulated radio frequency output of the aircraft transceiver is radiated by the antenna while simultaneously being sampled, demodulated and presented to the pilot's headphones. In short, the present invention is comprised essentially of two parts, the pickup and the amplifier. The pickup is placed in series with the transmission line where it samples any radio frequency signal, modulated or not, as it passes from the transceiver to the antenna. The sampled signal is demodulated and fed to the amplifier. The amplifier, which is placed in series with the pilot headphone jack, interrupts the audio flowing to the pilot headphones and allows the pilot to hear his own transmitted signal. In the preferred embodiment, the pickup and the amplifier are connected by a single electrical cable.

DETAILED DESCRIPTION OF THE INVENTION

Figure 1:
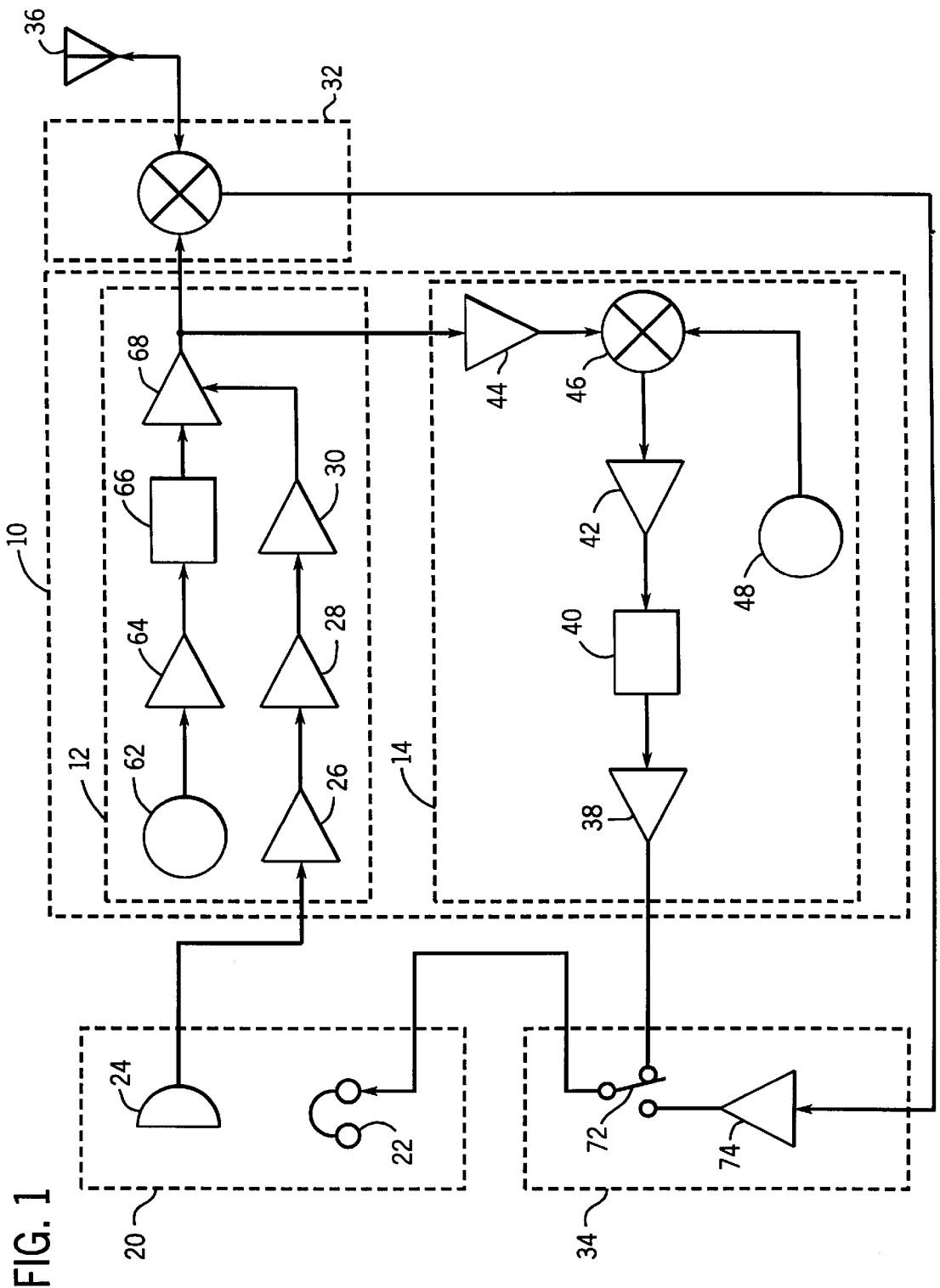
FIG. 1 is a block schematic diagram of the present radio communications system.

FIG. 1 is a block schematic diagram of a radio communications system suitable for use on board aircrafts. The communication system comprises a headset 20 that includes a set of headphones 22 and a microphone 24, a transceiver 10 that functions as either a source transmitter 12 or a source receiver 14, a pickup 32, an amplifier 34, and an antenna 36.

When in the transmitting mode, an audio frequency signal (the pilots voice) is generated by the microphone 24 and sent to the transceiver 10. Transceiver 10 amplifies the audio frequency signal by a microphone amplifier 26 and an audio amplifier 28, and then modulates the signal by a modulator 30. The modulated radio frequency output passes through the pickup 32 prior to being radiated by an antenna 36. While passing through the pickup 32 on its way to the antenna 36, the radio frequency signal is sampled, demodulated and then fed to amplifier 34. Amplifier 34 amplifies the sampled and demodulated radio frequency signal and feeds the resulting signal to the headset 20 and to the pilot's headphones 22.

When in the receiving mode and in the absence of a transmitted signal from the transceiver 10, the amplifier 34 is switched out of circuit. Thus, as the antenna 36 picks up a radio frequency signal, this signal is passed through the pickup 32 and the transceiver 10 and is presented to the pilot's headphones 22. The source of the radio frequency signal can be a destination source (i.e. another transmitter that is acting as a source).

Figure 2:
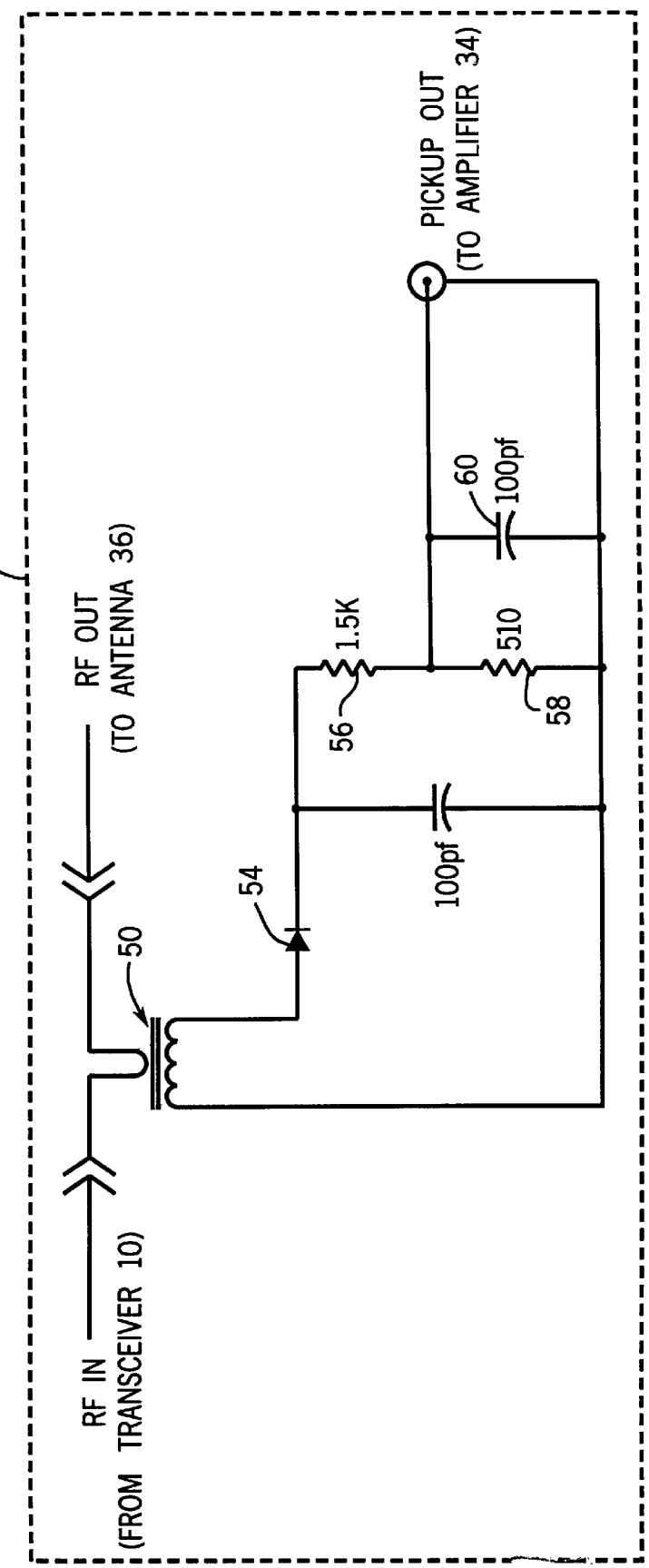
FIG. 2 is an electrical schematic diagram showing in detail the pickup shown generally in FIG. 1.

As mentioned above, when in a transmitting mode, the present invention employs a pickup 32 and an amplifier 34 to sample, demodulate, amplify and present to the pilot's headphones the modulated radio frequency output of the transceiver. FIG. 2 is an electrical schematic diagram showing in detail the operation of the pickup 32 as illustrated in FIG. 1. As shown in FIG. 2, the modulated radio frequency signal (originally generated by the transceiver 10) passes through the pickup 32 prior to being radiated by antenna 36. While passing through the pickup 32, the signal is sampled. Specifically, radio frequency current passing through the primary winding of transformer 50 on its way to the antenna 36 induces a current in the secondary winding of transformer 50. This current passes through diode 54 and resistors 56 and 58 causing a rectified voltage to appear across resistor 58. Capacitor 60 acts as a filter, separating the radio frequency component from the audio frequency component of the voltage prior to being sent to amplifier 34. Thus, the output signal from the pickup 32 has both an AC and a DC component. The AC component is the demodulated (audio) signal, and the DC component is proportional to the radio frequency energy flowing to the antenna.

Figure 3:
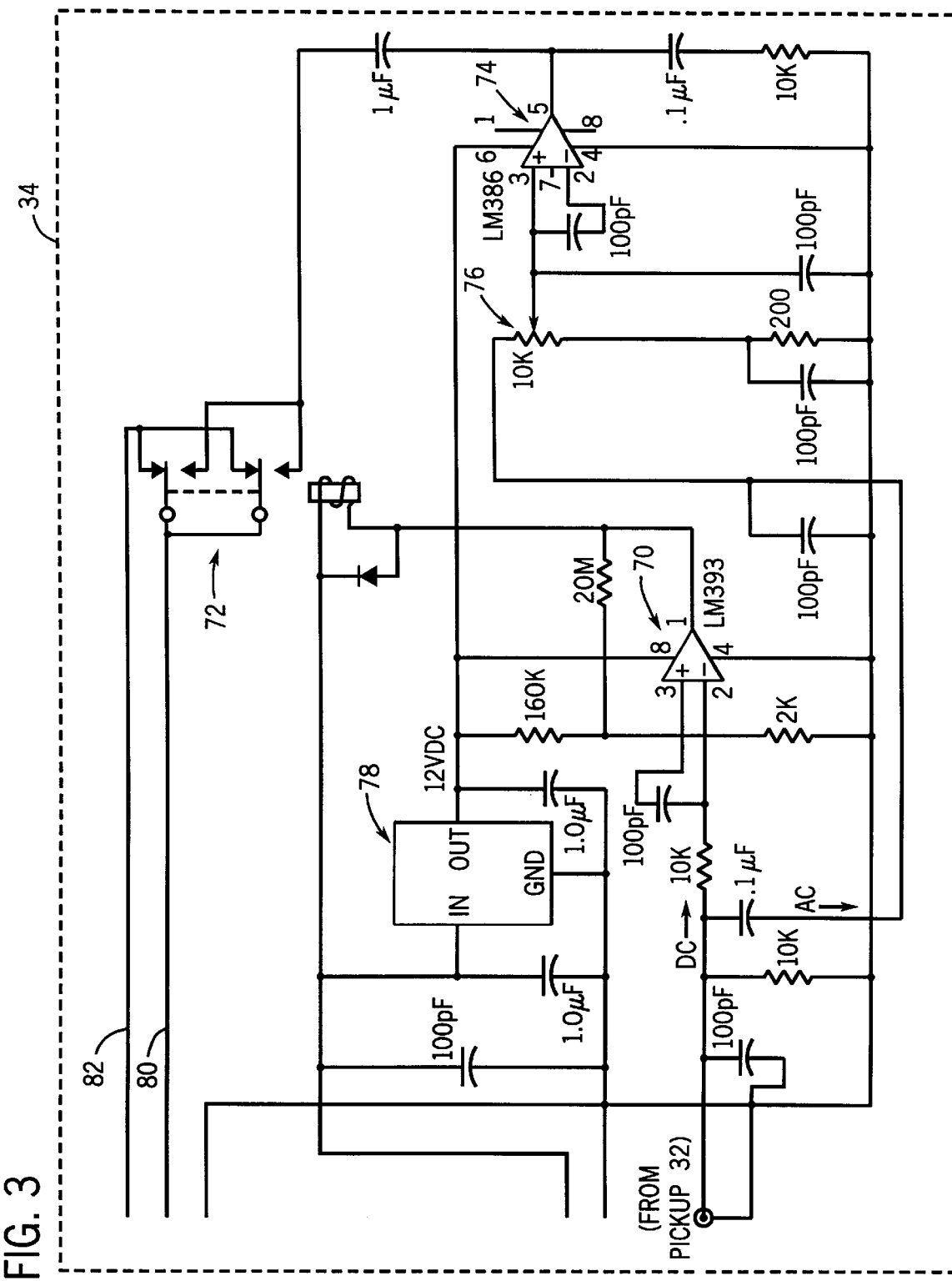
FIG. 3 is an electrical schematic diagram showing in detail the amplifier shown generally in FIG. 1.

FIG. 3 is an electrical schematic diagram showing in detail the operation of the amplifier 34 as illustrated in FIG. 1. As shown in FIG. 3, the sampled and demodulated radio frequency signal from the pickup is sent to the amplifier. In the amplifier, the signal is split into its AC and DC components. When a DC voltage of sufficient magnitude appears at the input of comparator 70, its output goes low allowing current to flow through the coil of relay 72 and causing the relay contacts to close. Voltage regulator 78 insures that the supply voltage to comparator 70 and amplifier 74 remains within a safe range. The AC (audio) signal is fed to an audio amplifier 74, the output of which passes through the normally open (now closed) contacts of relay 72 and on to the pilot headphones via a HEADPHONE OUT line 80. An external volume control 76 is provided to allow the pilot to adjust the loudness of the sampled signal at the headphones.

When in the receiving mode and no signal is being generated by the transceiver, a signal (DC voltage) is not detected by the comparator 70. As such, relay 72 remains de-energized and the HEADPHONE IN line 82 is connected to the HEADPHONE OUT line 80 through its normally closed contacts.

While a preferred embodiment of the invention has been illustrated and described, it will be appreciated that various changes can be made therein without departing from the spirit and scope of the invention. For example, the sampling of the signal may occur inductively, capacitively, electromagnetically, resistively or optically.

What is claimed is:

1. A radio communication system comprising:
    a) a radio transceiver capable of generating a modulated, amplified radio frequency output signal;
    b) an antenna connected to the radio transceiver;
    c) a pick-up coupled to the connection between the radio transceiver and the antenna capable of sampling a portion of the modulated amplified radio frequency output signal of the radio transceiver prior to that signal being radiated by the antenna and demodulating the sampled signal to generate a demodulated signal output;
    d) an audio amplifier connected to the pick-up for receiving the demodulated signal output; and
    e) a set of headphones connected to the audio amplifier for receiving the audio amplifier output.

2. The communication system of claim 1 wherein the pick-up comprises:
    a) a transformer having a primary winding and a secondary winding, the primary winding being coupled between the radio transceiver and the antenna such that a radio frequency current passing from the radio transceiver to the antenna passes through the primary winding and induces a current in the secondary winding and
    b) a demodulator connected between the secondary winding of the transformer and the audio amplifier.

3. A method of monitoring a modulated, amplified radio frequency output signal being sent from a radio transceiver to an antenna comprising:
    a) sampling a portion of the amplified modulated radio frequency output signal prior to that signal being radiated by an antenna to produce a sampled signal;
    b) demodulating the sampled signal to produce a demodulated sampled signal;
    c) amplifying the demodulated sampled signal to produce an amplified demodulated sampled signal; and
    d) presenting the amplified demodulated sampled signal to a set of headphones.

* * * * *